US012607421B2

(12) United States Patent
Watanabe et al.

(10) Patent No.: US 12,607,421 B2
(45) Date of Patent: Apr. 21, 2026

(54) METHOD FOR IMPROVING EFFICIENCY OF HEAT TRANSMISSION BY STEAM

(71) Applicant: KURITA WATER INDUSTRIES LTD., Tokyo (JP)

(72) Inventors: Kazuya Watanabe, Tokyo (JP); Masakazu Koizumi, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 37 days.

(21) Appl. No.: 18/574,037

(22) PCT Filed: Mar. 16, 2022

(86) PCT No.: PCT/JP2022/011876
§ 371 (c)(1),
(2) Date: Dec. 24, 2023

(87) PCT Pub. No.: WO2023/276319
PCT Pub. Date: Jan. 5, 2023

(65) Prior Publication Data
US 2024/0328730 A1 Oct. 3, 2024

(30) Foreign Application Priority Data
Jul. 2, 2021 (JP) ................................. 2021-110895

(51) Int. Cl.
*F28F 23/00* (2006.01)
*C09K 5/04* (2006.01)
(Continued)

(52) U.S. Cl.
CPC ............... *F28F 23/00* (2013.01); *C09K 5/04* (2013.01); *C23F 11/02* (2013.01); *F28B 1/00* (2013.01);
(Continued)

(58) Field of Classification Search
CPC C07C 229/12; C09K 3/18; C09K 5/04; C23F 11/02; C23F 11/145; F26B 21/00;
(Continued)

(56) References Cited

U.S. PATENT DOCUMENTS

| | | |
|---|---|---|
| 2013/0224331 A1 | 8/2013 | Fichot et al. |
| 2015/0030720 A1 | 1/2015 | Fichot et al. |

FOREIGN PATENT DOCUMENTS

| | | |
|---|---|---|
| CN | 2932271 | 8/2007 |
| CN | 109136902 | 1/2019 |

(Continued)

OTHER PUBLICATIONS

Machine translation of JP S6013084 (Year: 2024).*

(Continued)

*Primary Examiner* — Eric S Ruppert
*Assistant Examiner* — Hans R Weiland
(74) *Attorney, Agent, or Firm* — JCIPRNET

(57) ABSTRACT

Provided is a method for improving efficiency of heat transmission that enables improving the efficiency of heat transmission by steam in a steam system at a pH of less than 7. A method for improving the efficiency of heat transmission by steam, wherein, in a step of introducing steam into a heat exchanger to heat an object to be heated or a step of contacting the steam with a cooling body to liquefy the steam, a sarcosine compound is allowed to be present in the steam system at a pH of less than 7. As the sarcosine compound, a long-chain sarcosine compound represented by the following formula (I) is preferable. $R^1C(=O)-N(CH_3)-(CH_2)_n-COOR^2$ . . . (I) In formula (I), $R^1$ is an unsaturated or saturated linear or branched hydrocarbon group having 7 to 24 carbon atoms, n is an integer of 0 to 2, and $R^2$ is a hydrogen atom or a salt-forming group.

5 Claims, 1 Drawing Sheet

(51) Int. Cl.

| | |
|---|---|
| *C23F 11/02* | (2006.01) |
| *F28B 1/00* | (2006.01) |
| *F28B 1/02* | (2006.01) |
| *F28B 1/06* | (2006.01) |
| *F28F 21/08* | (2006.01) |

(52) U.S. Cl.

CPC .................. *F28B 1/02* (2013.01); *F28B 1/06* (2013.01); *F28F 21/083* (2013.01)

(58) Field of Classification Search

CPC .. F26B 21/005; F28B 1/00; F28B 1/02; F28B 1/06; F28F 13/04; F28F 21/083; F28F 23/00

See application file for complete search history.

(56) References Cited

FOREIGN PATENT DOCUMENTS

| | | | |
|---|---|---|---|
| DE | 1916628 | | 10/1970 |
| EP | 1691143 | | 8/2006 |
| JP | S6013084 | * | 12/1985 |
| JP | H09264695 | | 10/1997 |
| JP | 2012087213 | | 5/2012 |
| JP | 5332971 | | 11/2013 |
| JP | 6506865 | | 4/2019 |
| JP | 2019183380 | | 10/2019 |
| TW | 542858 | | 7/2003 |
| WO | 2021246367 | | 12/2021 |
| WO | WO-2021246367 A1 | * | 12/2021 ............ C23F 11/145 |

OTHER PUBLICATIONS

"Search Report of Europe Counterpart Application", issued on May 23, 2025, pp. 1-6.

Ichiro Tanasawa, "Dropwise Condensation—The Way to Practical Applications", Seisan-kenkyu, Jun. 1978, pp. 209-220, vol. 30, No. 6.

"International Search Report (Form PCT/ISA/210) of PCT/JP2022/011876", mailed on Jun. 7, 2022, with English translation thereof, pp. 1-4.

"Notice of Reasons for Refusal of Japan Counterpart Application", issued on Aug. 19, 2025, with English translation thereof, p. 1-p. 10.

"Office Action of Taiwan Counterpart Application", issued on Nov. 5, 2025, with English translation thereof, p. 1-p. 12.

"Office Action of Brazil Counterpart Application", issued on Oct. 13, 2025, with English translation thereof, p. 1-p. 5.

"Office Action of Taiwan Counterpart Application", issued on Dec. 30, 2025, with English translation thereof, p. 1-p. 14.

* cited by examiner

SOFT WATER

CHEMICAL

4 :PRESSURE REDUCING VALVE

13

11A

P1

P2

11 :STEAM PIPING

T1

T5

P3

T3

T2

COOLING
WATER

F

T4

3 :COOLING WATER
TUBE

2 : HEAT
EXCHANGER

12

1 : BOILER

CONDENSATE
WATER PIPING

CONDENSATE WATER

METHOD FOR IMPROVING EFFICIENCY OF HEAT TRANSMISSION BY STEAM

TECHNICAL FIELD

The present invention relates to a method for improving the efficiency of heat transmission by steam in a step of introducing steam into a heat exchanger to heat an object to be heated or a step of contacting the steam with a cooling body to liquefy the steam.

BACKGROUND ART

As the step of introducing steam into a heat exchanger to heat an object to be heated, for example, steam is introduced into heat exchangers to heat products by the steam for treatment for drying, concentrating, or sterilizing the products in factories for manufacturing foods or drinks, paper-making factories, and the like.

As the step of contacting the steam with a cooling body to liquefy the steam, for example, steam is used as power sources for turbines, then liquefied through a condenser, and collected in petrochemical factories, thermoelectric plants, and the like.

In both of such a step of heating by steam and such a step of liquefying steam, steam is contacted with a solid wall at lower temperature than saturated state, and is liquefied. There are film-wise condensation, in which condensate liquid forms a liquid film on the surface of a wall continuously, and drop-wise condensation, in which condensate liquid turns into many droplets without wetting the surface of a wall in this liquefaction process, the heat transfer coefficient in drop-wise condensation is several times to dozens of times higher than in film-wise condensation, and methods for subjecting steam to drop-wise condensation have therefore been variously examined until now (for example, NPL 1).

That is, the enhancement of the condensation efficiency by achieving drop-wise condensation enables improving the process efficiency and cutting the heat exchange heat transfer areas of heat exchangers. The enhancement is expected to cut initial cost by the downsizing of facilities, to cut the amounts of steam by improving the efficiency of existing facilities, and to enhance the productivity.

PTL 1 proposes a method for improving the efficiency of heat transmission by steam, and PTL 2 proposes a method for condensing steam. In these methods, film-forming amines are used. It is believed that the film-forming amines are adsorbed on metal surfaces in the steam system and ionically bound to the metal surfaces mutually, and adheres stably to the metal surfaces by hydrophobic bonding to form protective film layers (anticorrosive films), resulting in the prevention of the contact between the metal and water, so that drop-wise condensation can be achieved.

CITATION LIST

Patent Literature

PTL 1: JP 5332971 B
PTL 2: JP 6506865 B

Non Patent Literature

NPL 1: "Dropwise Condensation: The Way to Practical Applications" written by Ichiro Tanasawa, Seisan-kenkyu 30(6), the Institute of Industrial Science, the University of Tokyo, June, 1978, p 209-220

SUMMARY OF INVENTION

Technical Problem

A problem was however that since conventional film-forming amines were not adsorbed on the heat transmission surfaces made of stainless steel or the like of heat exchangers in steam systems at a low pH of less than 7, the efficiency of heat transmission was not improved.

An object of the present invention is to provide a method for improving the efficient of heat transmission that enables effectively improving the efficiency of heat transmission by steam even in a steam system at a low pH of less than 7.

Solution to Problem

The present inventor has repeated examination earnestly in order to solve the above-mentioned problem and consequently found that a sarcosine compound is stably adsorbed on a metal surface, and fully exhibits the effect of promoting the drop-wise condensation of steam to enable enhancing the efficiency of heat transmission even in a steam system at a pH of less than 7.

That is, the present invention has the following as the gist.

[1] A method for improving efficiency of heat transmission by steam, wherein, in a step of introducing steam into a heat exchanger to heat an object to be heated or a step of contacting the steam with a cooling body to liquefy the steam, a sarcosine compound is allowed to be present in a steam system at a pH of less than 7.

[2] The method for improving efficiency of heat transmission by steam according to [1], wherein the sarcosine compound is a long-chain sarcosine compound represented by the following formula (I).

$$R^1C(=O)-N(CH_3)-(CH_2)_n-COOR^2 \tag{I}$$

wherein, in formula (I), $R^1$ is an unsaturated or saturated linear or branched hydrocarbon group having 7 to 24 carbon atoms, n is an integer of 0 to 2, and $R^2$ is a hydrogen atom or a salt-forming group.

[3] The method for improving efficiency of heat transmission by steam according to [1] or [2], wherein an emulsifier and/or a neutralizing amine is further allowed to be present in the steam.

[4] The method for improving efficiency of heat transmission by steam according to any one of [1] to [3], wherein the heat exchanger is a condenser, a reboiler of a distilling column, an air-cooled condenser, a dryer, a concentrator, or a temperature raising device.

[5] The method for improving efficiency of heat transmission by steam according to any one of [1] to [4], wherein a surface of the heat exchanger in contact with the steam is made of stainless steel.

Advantageous Effects of Invention

According to the present invention, improvement in efficiency of heat transmission by steam enables heating an object to be heated efficiently in a method for introducing steam into a heat exchanger to heat an object to be heated, and also enables achieving drop-wise condensation to condense steam efficiently in a method for contacting steam with a cooling body in the heat exchanger to liquefy the steam.

According to the present invention, the formation of condensation water films can be suppressed to effectively enhance the efficiency of heating by steam efficiency without reduction in production efficiency or large-scale renewal of facilities in a heating step of heating an object to be heated by steam through a heating surface made of a metal material such as stainless steel, preferably in a heat-drying step.

According to the present invention, the enhancement of the condensation efficiency by achieving drop-wise condensation enables cutting the amount of steam used, improving the process efficiency, and reducing the heat transfer surface area of a heat exchanger, and also enables cutting the initial cost by downsizing facilities, cutting the amount of steam by improving the efficiency of existing facilities, and enhancing the productivity. Especially the enhancement of the efficiency of heat transmission of a condenser improves vacuum to enables saving energy.

BRIEF DESCRIPTION OF DRAWING

FIG. 1 is a system diagram showing a tester used in Examples and Comparative Example.

DESCRIPTION OF EMBODIMENTS

Hereinafter, embodiments of the present invention will be described in detail.

A method for improving the efficiency of heat transmission by steam is characterized in that, in a step of introducing steam into a heat exchanger to heat an object to be heated or a step of contacting the steam with a cooling body to liquefy the steam, a sarcosine compound is allowed to be present in a steam system at a pH of less than 7.

The sarcosine compound to be used in the present invention will be first described.

Since the sarcosine compound to be used in the present invention is excellent in the adsorptive properties to the heat transfer surface made of a metal, and enables obtaining excellent effect of improving the efficiency of heat transmission, the sarcosine compound is preferably a long-chain sarcosine compound represented by the following formula (I).

$$R^1C(=O)-N(CH_3)-(CH_2)_n-COOR^2 \qquad (I)$$

In formula (I), $R^1$ is an unsaturated or saturated linear or branched hydrocarbon group having 7 to 24 carbon atoms, n is an integer of 0 to 2, and $R^2$ is a hydrogen atom or a salt-forming group.

The saturated or unsaturated hydrocarbon group having 7 to 24 carbon atoms, namely $R^1$, may be linear or branched. Examples thereof include an alkyl group, an alkenyl group, an alkadienyl group, and an alkynyl group. The hydrocarbon group is preferably a linear alkyl group or a linear alkenyl group. $R^1$ preferably has 15 to 22 carbon atoms.

n is an integer of 0 to 2, and is preferably 1 or 2 from the viewpoint of suppressing the corrosion.

$R^2$ is a hydrogen atom or a salt-forming group. When $R^2$ is a salt-forming group, preferable examples of the salt include an amine salt, an ammonium salt, and an alkali metal salt.

Particularly preferable examples among specific examples of such a long-chain sarcosine compound include N-oleoyl sarcosine, N-lauroyl sarcosine, N-stearoyl sarcosine, and N-cocoyl sarcosine.

These sarcosine compounds can be used singly or in combination of two or more thereof as needed.

In order to allow the sarcosine compound to be present in a steam system, the sarcosine compound only has to be added to steam to be fed to the heat exchanger or feed water for generating the steam.

The sarcosine compound may be dissolved in a solvent such as water, methanol, ethanol, or isopropanol at a concentration of around 0.001 to 10% by weight and added to steam or feed water, and it is also preferable that the sarcosine compound be prepared into an aqueous emulsion using an emulsifier, and this be added to steam or feed water.

The emulsifier to be used in this case is preferably an emulsifier having a high HLB (hydrophilic-lipophilic balance) value from the viewpoint of the stability of the emulsion. The HLB value of the emulsifier to be used is preferably 12 to 16 and more preferably 13 to 15.

Examples of such an emulsifier include polyoxyethylene alkylamines, and the emulsifier is preferably a polyoxyethylene alkylamine having an alkyl group with 10 to 18 carbon atoms.

As an emulsifier other than this, an alkali metal salt of a fatty acid, especially an alkali metal salt of a saturated or unsaturated fatty acid having 8 to 24 carbon atoms and particularly an alkali metal salt of a saturated or unsaturated fatty acid having 10 to 22 carbon atoms, can be suitably used. Specific examples include sodium and potassium salts of saturated or unsaturated fatty acids such as capric acid, lauric acid, myristic acid, palmitic acid, stearic acid, archaic acid, behenic acid, oleic acid, erucic acid, linoleic acid, and linolenic acid. The alkali metal salt of fatty acid that can be preferably used also include a sodium or potassium salt of a fatty acid produced from edible oil and fat. The alkali metal salt of fatty acid is especially an unsaturated fatty acid having 14 to 22 carbon atoms, for example, an alkali metal salt of a fatty acid containing 25% by weight or more of at least one selected from the group consisting of oleic acid, erucic acid, linoleic acid, and linolenic acid.

An ester of glycerin and the fatty acid described above can also be suitably used as the emulsifier, and especially an ester of glycerin and stearic acid can be preferably used.

These emulsifiers may be used singly in combination of two or more thereof.

When an aqueous emulsion is prepared using the emulsifier such as these alkali metal salts of the fatty acids, the ratio of blending of the sarcosine compound to the emulsifier is suitably a weight ratio (sarcosine compound/emulsifier) of 40/1 to 1/1, especially around 20/1 to 2/1.

The above-mentioned sarcosine compound is preferably allowed to be present at a rate of 0.01 to 10 ppm, especially 0.1 to 1 ppm, with respect to the amount of steam. If the amount of the sarcosine compound is still smaller than this range, the sarcosine compound does not enable obtaining the effect of suppressing condensation water film formation, the effect of promoting drop-wise condensation, and the effect of enhancing the efficiency of heat transmission. If the amount is still larger, adhesive attachments may be produced in the system.

The "ppm" used here is the proportion of the sarcosine compound in weight with respect to water corresponding to the amount of steam, and corresponds to "mg/L-water".

In the present invention, other chemicals may be used in combination with the above-mentioned sarcosine compound.

For example, one or more long-chain aliphatic amines such as octadecylamine, oleylamine, and oleylpropylenediamine may be added in combination with the sarcosine compound. The combined use of the long-chain aliphatic amine enables obtaining the effects of suppressing condensate water film formation, promoting drop-wise condensation, and enhancing the efficiency of heat transmission even in the steam system at a pH of 7 or more.

In this case, the amount of the long-chain aliphatic amine added varies depending on the amount of the sarcosine compound used, the type of the object to be heated, the styles of the facilities, and the like, and is preferably adjusted to 0.001 to 10 ppm, especially 0.01 to 2.0 ppm, with respect to the amount of steam.

A neutralizing amine having the function of adjusting the pH may be used in combination, and the combined use of the neutralizing amine enables obtaining the effect of reducing the corrosion rate of piping for steam/condensate water in the heat exchanger, or upstream of or downstream of the heat exchanger. As the neutralizing amine, a volatile amine such as ammonia, monoethanolamine (MEA), cyclohexylamine (CHA), morpholine (MOR), diethylethanolamine (DEEA), monoisopropanolamine (MIPA), 3-methoxypropylamine (MOPA), 2-amino-2-methyl-1-propanol (AMP), or diglycol amine (DGA) can be used. These may be used singly or in combination of two or more thereof. The pH may be adjusted with ammonia derived from the pyrolysis of the following deoxidizers instead of neutralizing amine.

When the neutralizing amine is used in combination, the amount of the neutralizing amine added varies depending on the amount of the sarcosine compound used, the type of the object to be heated, the styles of facilities, and the like, and is preferably adjusted to 0.1 to 50 ppm, especially 5 to 15 ppm, with respect to the amount of steam.

A deoxidizer may be used in combination with the sarcosine compound, and the combined use of the deoxidizer enables obtaining the effect of reducing the corrosion of the heat exchanger and the like in the same way as the neutralizing amine. As the deoxidizer, a hydrazine derivative such as hydrazine or carbohydrazide can be used. As the non-hydrazine deoxidizer, carbohydrazide, hydroquinone, 1-amino pyrrolidine, 1-amino-4-methylpiperazine, N,N-diethylhydroxylamine, isopropylhydroxylamine, erythorbic acid or a salt thereof, ascorbic acid or a salt thereof, tannic acid or a salt thereof, saccharides, sodium sulfite, or the like can also be used. These may be used singly or in combination of two or more thereof.

When the deoxidizer is used in combination, the amount of the deoxidizer added varies depending on the amount of the sarcosine compound used, the type of the object to be heated, the styles of the facilities, and the like, and is preferably adjusted to 0.01 to 3 ppm, especially 0.05 to 1 ppm with respect to the amount of steam.

The above-mentioned combined chemicals may be added at the same point as the sarcosine compound, or may be added at a different point. When two or more chemicals are added at the same point, the chemicals to be added may be mixed beforehand and added, or may be added separately.

The model or the type of the heat exchanger according to the present invention is not particularly limited. Examples of the heat exchanger to which the present invention is applied include a condenser, an air-cooled condenser, a reboiler of a distilling column, a dryer, a concentrator, and a temperature raising device.

These heat exchangers usually have heat transfer surfaces (surface in contact with steam) made of a metal such as stainless steel.

In the present invention, the sarcosine compound enables effectively obtaining the effect of enhancing the efficiency of heat transmission in a steam system at a pH of less than 7, for example, at a pH of around 5 to 7, which effect the conventional film-forming amines difficultly enables.

The pH in the steam system used here refers to a pH value at 20° C. of condensate water, obtained by condensing steam.

Examples of the heat exchanger in which a steam system at a pH of less than 7 is formed include, but are not limited to, a heat exchanger in which the pH of steam is less than 7 due to the use of soft water as feed water.

EXAMPLE

The present invention will be described more specifically by giving the Examples.

[Tester]

In the following Examples and Comparative Example, a test for inspecting the effect of improving the efficiency of heat transmission by steam was performed using a tester shown in FIG. 1.

This tester sends steam generated in a boiler 1 to a heat exchanger 2 through steam piping 11, condense the steam on the surface of a cooling water tube 3 made of SUS (304) in the heat exchanger 2, and takes out the condensate water through condensate water piping 12.

The heat exchanger 2 circulates cooling water in the cooling water tube 3 made of the SUS (304) to cool and condense the steam on the outer surface of the tube 3. The steam piping 11 for feeding steam to the heat exchanger 2 is provided with a chemical injection point 11A, which is configured so that a chemical is injected from the chemical injection piping 13.

The reference numeral 4 is a pressure reducing valve.

The reference characters P1 to P3 are pressure gauges for measuring pressures in the piping 11 and the heat exchanger 2. The reference character T1 is a thermometer for a cooling water inlet of the cooling water tube 3, and the reference character T2 is a thermometer for a cooling water outlet. The reference character F is a flowmeter for cooling water. The reference character T3 is a thermometer for an inlet (steam) of the heat exchanger 2, the reference character T4 is a thermometer for an outlet (condensate water), and the reference character T5 is a thermometer for measuring temperature in the heat exchanger 2.

Example 1

<Test Conditions>

Soft water was fed to the boiler 1 of the tester, followed by operation under the conditions shown in Table 1 to generate steam. N-oleyl sarcosine was used as a sarcosine compound and added to the feed water to 1 mg/L-water at the chemical injection point 11A from the chemical injection piping 13. The N-oleyl sarcosine was added as an aqueous solution at a concentration of 0.04% by weight with continuous stirring using a stirrer to prevent the separation. The pH at 20° C. converted from the pH of the condensate water (drained water) drained from the condensate water piping 12 was 5.

TABLE 1

| Test Conditions | |
| --- | --- |
| Pressure (MPa) | 0.5 |
| Steam amount (L/h) | 662 |
| Blow amount (L/h) | 59 |
| Blow rate (%) | 9 |

In such a test of steam condensation, the heat exchanger inlet temperature of the cooling water (thermometer T1) and the heat exchanger outlet temperature of the cooling water (thermometer T2) were measured 20 hours after the test start. The differential between this inlet temperature and this outlet temperature was calculated to examine the efficiency of heat transmission. Table 2 shows the results.

As the temperature difference increases, the efficiency of heat transmission becomes more excellent, and steam is cooled more efficiently.

Comparative Example 1

A test was performed in the same way as in Example 1 except that oleyl propylenediamine was substituted for N-oleyl sarcosine. Table 2 shows the results.

Example 2

A test was performed in the same way as in Example 1 except that N-cocoyl sarcosine was substituted for N-oleyl sarcosine. Table 2 shows the results.

TABLE 2

Test Results

|  | Example 1 | Comparative Example 1 | Example 2 |
|---|---|---|---|
| Added chemical | N-Oleyl sarcosine | Oleyl propylenediamine | N-Cocoyl sarcosine |
| Cooling water inlet temperature (° C.) | 21.7 | 21.1 | 21.3 |
| Cooling water outlet temperature (° C.) | 41.7 | 38.7 | 39.7 |
| Temperature difference between inlet and outlet for cooling water (° C.) | 20.0 | 17.6 | 18.4 |

[Results and Discussion]

Table 2 shows that, according to the present invention, the use of a sarcosine compound enables improving the efficiency of heat transmission by steam more effectively than the use of the film-forming amine to be used in the conventional technique.

The present invention has been described in detail using a specific aspect. However, it is apparent to those skilled in the art that various modifications are possible without departing from the spirit and scope of the present invention.

The present application is based on Japanese Patent Application No. 2021-110895, filed on Jul. 2, 2021, the contents of which are incorporated herein in its entirety.

REFERENCE SIGNS LIST

1: boiler
2: heat exchanger
3: cooling water tube
4: pressure reducing valve
P1: pressure gauge 1
P2: pressure gauge 2
P3: pressure gauge 3
T1: thermometer for cooling water inlet
T2: thermometer for cooling water outlet
T3: thermometer for heat exchanger inlet
T4: thermometer for heat exchanger outlet
T5: thermometer in heat exchanger
F: cooling water flowmeter

The invention claimed is:

1. A method for improving efficiency of heat transmission by steam, wherein, in a step of introducing steam generated from a boiler into a heat exchanger to heat an object to be heated or a step of contacting the steam with a cooling body to liquefy the steam, a sarcosine compound is allowed to be present in a steam system at a pH of less than 7.

2. The method for improving efficiency of heat transmission by steam according to claim 1, wherein the sarcosine compound is a long-chain sarcosine compound represented by the following formula (I):

$$R^1C(=O)-N(CH_3)-(CH_2)_n-COOR^2 \qquad (I)$$

wherein, in formula (I), $R^1$ is an unsaturated or saturated linear or branched hydrocarbon group having 7 to 24 carbon atoms, n is an integer of 0 to 2, and $R^2$ is a hydrogen atom or a salt-forming group.

3. The method for improving efficiency of heat transmission by steam according to claim 1, wherein an emulsifier and/or a neutralizing amine is further allowed to be present in the steam.

4. The method for improving efficiency of heat transmission by steam according to claim 1, wherein the heat exchanger is a condenser, an air-cooled condenser, a reboiler of a distilling column, a dryer, a concentrator, or a temperature raising device.

5. The method for improving efficiency of heat transmission by steam according to claim 1, wherein a surface of the heat exchanger in contact with the steam is made of stainless steel.

\* \* \* \* \*